Jan. 6, 1959 L. P. HUNTER 2,867,733

CURRENT MULTIPLICATION TRANSISTORS AND METHOD OF PRODUCING SAME

Filed May 14, 1953 2 Sheets-Sheet 1

INVENTOR.
LLOYD P. HUNTER
BY Joseph C. Sweet, Jr.
ATTORNEY

INVENTOR.
LLOYD P. HUNTER
BY Joseph C. Sweet, Jr.
ATTORNEY 2,867,733
Patented Jan. 6, 1959

2,867,733

CURRENT MULTIPLICATION TRANSISTORS AND METHOD OF PRODUCING SAME

Lloyd P. Hunter, Poughkeepsie, N. Y., assignor to International Business Machines Corporation, New York, N. Y., a corporation of New York Application May 14, 1953, Serial No. 354,956

8 Claims. (Cl. 307—88.5)

This invention relates to semiconductor translating devices or transistors, and more particularly to transistors of the current multiplication type and methods of producing such transistors and controlling their current gain.

The transistor was initially described in an article by Bardeen and Brattain in the "Physical Review," vol. 74, pp. 230–231, July 15, 1948. It was later described in greater detail in an article by the same authors in the "Physical Review," vol. 75, pp. 1208–1225, April 15, 1949.

Since that time various forms of transistors have been produced, including the coaxial transistor, the junction transistor, the phototransistor, the fieldistor, and transistors having more than three electrodes. These are described in the following articles:

Kock and Wallace, "Coaxial Transistors," Electrical Engineering, vol. 68, pp. 222–223, March, 1949;

Shockley et al., "p-n Junction Transistors," Physical Review, vol. 83, pp. 151–162, July 1, 1951;

Shive, "The Phototransistor," Bell Laboratories Record, vol. 28, pp. 337–342, August, 1950;

Stuetzer, "A Crystal Amplifier With High Input Impedance," Proceedings of the I. R. E., vol. 38, pp. 868–871, August, 1950;

Haegele, "Crystal-tetrode Mixer," Electronics, vol. 22, pp. 80–81, October, 1949;

Scott, "Crystal Triodes," Electrical Communication, vol. 28, pp. 195–208, September, 1951; and, Reich et al., "Effect of Auxiliary Current on Transistor Operation," Journal of Applied Physics, vol. 22, pp. 682–683, May, 1951.

Briefly, the basic or point-contact transistor comprises a small block or body of semiconductor material to which are applied at least three electrodes, termed base, collector, and emitter, respectively. The base is of the ohmic type and the emitter and collector are point contacts or rectifying electrodes. The semiconductor material may be of either n-type, indicating that the charges in the material normally available for carrying current are negative, i. e., electrons, or p-type, indicating that the charges in the material normally available for carrying current are positive, i. e., "holes." It has been found that germanium is a particularly suitable semiconductor material, and the usual type of germanium employed is n-type. When potentials are properly applied between the base and each of the other two electrodes, a translating device is produced wherein variations in current in the collector-base or output circuit are produced by variations in current in the emitter-base or input circuit.

The phototransistor differs from this basic transistor in that the point-contact emitter electrode is replaced by a source of light rays impinging upon the surface of the semiconductor block at or adjacent the junction of the collector electrode therewith. Modulation of this light beam then produces variations in current in the collector-base or output circuit.

One form of the junction-type transistor comprises a zone of semiconductor material of one conductivity type sandwiched between two zones of semiconductor material of the other conductivity type with a respective ohmic contact made to each of these zones. The three contacts are again termed base, collector and emitter electrodes, the base electrode being the one connected to the central zone of the semiconductor material.

For a point-contact transistor utilizing an n-type block or for a four-zone junction transistor wherein the zones are arranged in p-n-p-n fashion, the emitter electrode is biased positively and injects holes and the collector electrode is biased negatively and collects these holes. This collection is done in such a way that holes arriving in the neighborhood of the collector may allow additional electrons to be liberated to flow to the base. Thus, for a given change in the emitter current, we may have a greater corresponding change in collector current. To describe this phenomena, the current-multiplication factor $\alpha$ is defined as follows:

$$\text{Current gain}=\alpha=-\frac{\partial I_c}{\partial I_e}\Big|V_c=\text{const.}$$

where the subscripts $e$ and $c$ refer to the emitter and collector electrodes respectively, and $V_c$ is the collector-to-base voltage.

Current multiplication, i. e., alpha greater than unity, can exist in point-contact type transistors, and may also occur in other types of transistors, e. g., the junction type. See U. S. Patent No. 2,623,105, granted December 23, 1952, to Shockley et al., and the article by Ebers entitled "Four-Terminal p-n-p-n Transistors" at pp. 1361–1364 of the November 1952 issue of Proceedings of the I. R. E.

One general feature of this invention is the improvement of the performance characteristics of transistors, and more specifically the enhancement of the current gain of transistors of the current-multiplication type.

Another feature of the invention is a method of producing current-multiplication transistors having much higher current gains than have heretofore been attained.

Another feature of this invention is a method of controlling the high current gain of such current-multiplication transistors.

Briefly, these and other features of the invention are accomplished by the provision of a reservoir of accumulated excess carriers in the semiconductor body of a transistor by directing a beam of electrons upon one surface of the semi-conductor body.

Such other features will be pointed out in the following description and claims and illustrated in the accompanying drawings which disclose, by way of example, the principle of this invention and the best mode which has been contemplated of applying that principle.

In the drawings:

Fig. 1, which is not to scale, illustrates a circuit diagram of a current-multiplication transistor in accordance with a companion invention;

Figure 1:
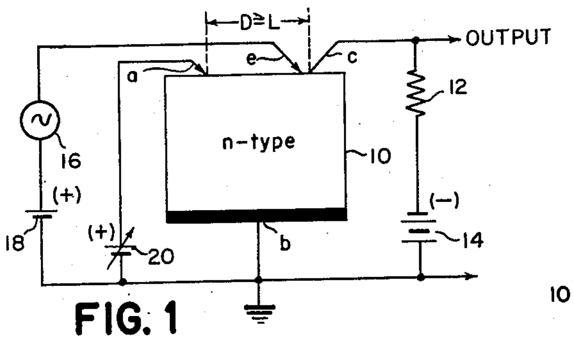

In Fig. 1 is shown a current multiplication transistor as disclosed in the application of Richard F. Rutz, Serial No. 354,955, filed concurrently herewith. A consideration of this transistor will be helpful in explaining the basic principle of the present invention. As shown in Fig. 1, body 10, which may be of n-type semiconductor material, e. g., germanium, has applied to one surface thereof base electrode *b* of the ohmic type. To the opposite surface thereof are applied three rectifying or point-contact electrodes. Two of these, the emitter *e* and collector *c* are closely spaced. The third, or auxiliary point-contact electrode *a*, is spaced a distance D from the collector electrode *c*, which distance is large relative to the collector-to-emitter electrode spacing. This distance D is equal to or greater than L, the diffusion length for the average lifetime of the excess carriers in the semiconductor material. The average lifetime is affected by surface recombination as well as bulk recombination and is, therefore, somewhat affected by the geometry of the semiconductor block.

The collector electrode *c* is preferably made of Phosphor bronze and electro-formed in the conventional manner, while emitter *e* and auxiliary electrode *a* may be of any suitable material, e. g., Phosphor bronze, tungsten or beryllium copper.

A load resistance 12 and battery 14 are connected between collector *c* and base *b*, which may be grounded. The negative terminal of battery 14 is connected to load impedance or resistor 12 in order to bias collector *c* in the reverse direction. A signal source, e. g., generator 16, and a second battery 18 are connected in series between emitter *e* and base *b*, the negative terminal of battery 18 being connected to base *b* in order to bias emitter *e* positively, i. e., in the forward direction. A third battery 20, which may be variable as indicated by the arrow, is connected between base *b* and the auxiliary electrode *a* and is poled to bias the latter positively. This biasing of auxiliary electrode *a* relative to the base electrode *b* is such as to inject holes into the n-type semiconductor body 10. Since auxiliary electrode *a* is spaced from the collector electrode *c* by the distance L, a reservoir of accumulated excess carriers is maintained in the semiconductor body 10 and centered about auxiliary electrode *a* as the source.

Figure 2:
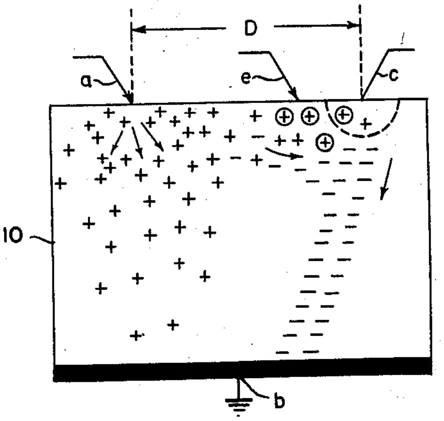
Fig. 2 is a schematic diagram useful in explaining the operation of the transistor of Fig. 1.

This may be explained most easily by reference to Fig. 2, which represents graphically the action within the transistor body 10. Holes injected by the emitter are represented by the symbol ⊕, holes injected by the auxiliary electrode are represented by the symbol +, and electrons are represented by the symbol —. The region adjacent the collector where the amplifying mechanism is concentrated is indicated by the dotted line boundary.

As pointed out previously, holes injected by the emitter electrode *e* may, as they arrive in the neighborhood of the collector electrode *c*, allow additional electrons to be liberated to flow to the base electrode *b*. Thus, for a given change in the emitter current, we may have a greater corresponding change in collector current, i. e., the current gain or $\alpha$ is greater than unity. If a second positively biased point-contact electrode or emitter were placed close to the collector, as has been done in prior art transistors, the same action occurs for this second emitter. In other words, the current flowing in each of the two emitter electrodes independently affects the collector current.

Figure 3:
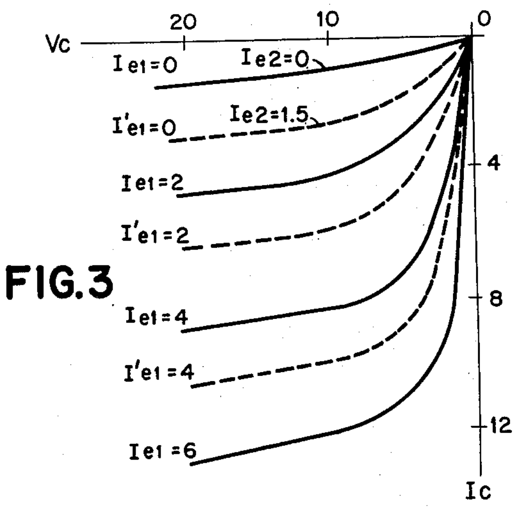
Fig. 3 shows the characteristic curves of prior art, multiple-emitter transistors.

Such "mixing" action is illustrated in the characteristic curves of Fig. 3, which were taken on a two-emitter closely spaced point-contact transistor of the type disclosed in Haegele's article referred to above. The solid lines depict the $V_c/I_c$ curves for varying values of current flow through the first emitter electrode and with zero current flow through the second emitter electrode. The dashed lines represent the corresponding curves when the second emitter is biased to produce a constant current flow of 1.5 ma. therethrough. Note that the resultant action is merely one of mixing, i. e., each of the dashed lines is merely moved downwardly in position from the corresponding solid line and by a substantially constant amount from curve to curve. In other words, there is no significant change in the separation of adjacent curves and hence, the current amplification factor $\alpha$ of the transistor has not been altered appreciably.

Figure 4:
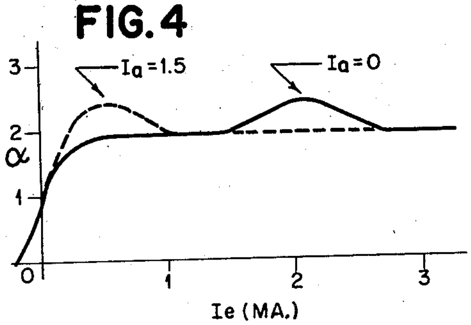
Fig. 4 shows the $\alpha/I_e$ characteristics of such prior art multiple-emitter transistors.

It should be noted at this point, however, that the incremental $\alpha$ may change when a constant current is applied through the second closely spaced emitter. Fig. 4, which is a plot of $\alpha$ vs. $I_{e1}$ for the transistor whose characteristics are shown in Fig. 3, illustrates this. Here again the solid line is for the case where $I_{e2}=0$ and the dashed line is for the case where $I_{e2}=1.5$ ma. It will noticed that the peak in the solid curve is displaced to the left by 1.5 ma. from the peak in the dashed line curve. This may be explained on the basis that the current multiplication factor depends upon the collector current. Thus, such a shift would be expected as an increased amount of current flows from the second emitter electrode into the collector electrode. However, it must be emphasized that while the incremental $\alpha$ changes as shown in Fig. 4, there is no appreciable variation in the average $\alpha$ defined over the interval of $I_{e1}$ from zero to 3.0 ma., which is the same for both values of $I_{e2}$.

Referring again to Fig. 2, let us now consider the case of the transistor shown in Fig. 1 wherein the auxiliary electrode *a* is spaced at least the distance L from the collector *c*. L, it will be recalled, is the diffusion length for the average lifetime of the excess carriers in the semiconductor. Since the excess carriers have a finite lifetime, most of the holes injected by the auxiliary electrode *a* will not reach the collector electrode *c*. The resultant steady positive current flowing into the auxiliary electrode *a* creates what may be thought of as a reservoir of accumulated holes, and more or less of these holes will make their way to the collector electrode *c* depending upon the strength of the electric field in which they find themselves.

Figure 5:
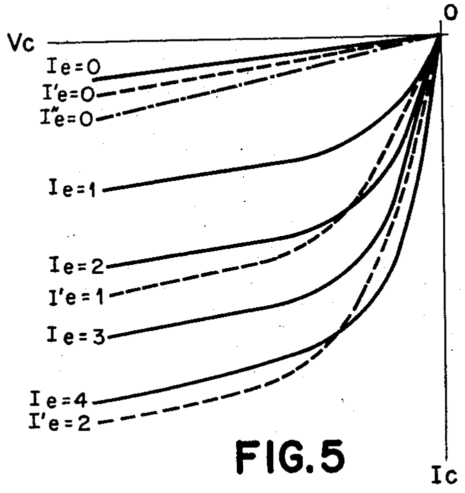
Fig. 5 shows typical characteristic curves of the current-multiplication transistor of Fig. 1 for comparison with Fig. 3.

It has been found that the effect of a constant positive current flowing into auxiliary electrode *a* of Fig. 1 is to increase the current multiplication factor $\alpha$ of the transistor by an appreciable amount. This is shown in Fig. 5, which illustrates, for comparison with Fig. 3, characteristic curves of the transistor of Fig. 1. Again, the solid lines indicate the $V_c/I_c$ characteristic curves for varying values of emitter current with no current flowing through the auxiliary electrode *a*, and the dashed lines indicate the corresponding curves when a constant positive value of current flows through the auxiliary electrode *a*. For the latter case there will be noticed an increased separation of the successive lines of constant emitter current, which means that both the incremental $\alpha$ and the average $\alpha$ of the transistor have been increased.

Figure 6:
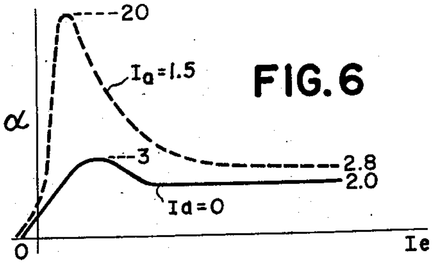
Fig. 6 shows typical $\alpha/I_e$ characteristics of the current-multiplication transistor of Fig. 1 for comparison with Fig. 4.

This is more readily apparent in Fig. 6, which shows the $\alpha$ vs. $I_e$ curves for the same transistor for the same two values of auxiliary electrode current. The solid line $\alpha$ curve has an initial peak of about 3 and then falls to a somewhat constant value of approximately 2. This is for the case where $I_2=0$ and is similar to the conventional point-contact transistor having only emitter, collector and base electrodes. The addition of the biased auxiliary electrode in accordance with Fig. 1, however, produces the dotted line $\alpha$ curve having an initial very much sharper peak of about 20, which then falls off to a fairly constant value of approximately 2.8. In comparison with Fig. 4, there will be observed that not only has the small signal or incremental $\alpha$ been increased, but also the average $\alpha$ has been increased. Indeed, in transistors constructed in accordance with Fig. 1, the incremental $\alpha$ has been increased by a factor of 10 or more with reasonably small current flow through the auxiliary electrode *a*, and the average $\alpha$ increased by a factor of about 3. The latter depends, of course, upon the range of emitter current considered in calculating the average value. If one is interested only in small signals, the range of emitter current considered would, of course, be small. The average $\alpha$ would then be approximately equal to the incremental $\alpha$.

A typical value of L for n-type germanium is 0.015" to 0.020" with the emitter and collector electrodes spaced apart approximately 0.002" and the body 10 of approximately 0.025" thickness. The spacing of the emitter and collector electrodes must, of course, be less than L and the thickness of the semiconductor body should be greater than L so that the reservoir of accumulated excess carriers is not drained into base electrode *b*. While the spacing of the auxiliary electrode *a* and collector electrode *c* is preferably equal to or greater than L, as shown in Fig. 1, as an engineering compromise the spacing may be made somewhat less than this value if the resultant decrease in the back resistance of the transistor can be tolerated.

Back resistance is defined as the reciprocal of the slope of the collector $V/I$ characteristic for $I_e=0$. It will be noted that the back resistance of the transistor of Fig. 1 does change slightly when a current is passed through the auxiliary electrode *a*, as indicated by the dashed line in Fig. 5 marked $I'=0$. However, as shown in this figure by the dashed-and-dotted line marked $I''_e=0$, the effect of moving auxiliary electrode *a* closer to the collector electrode *c* is to increase further the slope of this curve, i. e., to decrease the back resistance of the transistor. The passage of increased current through the auxiliary electrode also decreases the back resistance for a given auxiliary electrode-to-collector electrode spacing.

Fig. 5 also illustrates the variation in saturation resistance of the transistor, which is defined as the reciprocal of the slope of the collector $V/I$ characteristic curves for high emitter current and low collector voltage. It will be seen that this decreases as the auxiliary electrode current increases. For transistors utilized in switching circuits it is desirable to have a low value of saturation resistance and a high value of back resistance. It will thus be apparent to those skilled in the art that transistors constructed in accordance with Fig. 1 are very useful in switching circuits. Further, these transistors exhibit very good frequency response.

While the above description has been given in terms of constant current applied to the auxiliary electrode *a*, it will, of course, be apparent that alternatively a constant voltage might be applied to this electrode, or that the voltage or current might be varied or modulated to control the current gain of the transistor. To this end, the voltage source 20 shown in Fig. 1 is indicated as being variable.

Another way of accomplishing such modulation is to connect the auxiliary electrode *a* directly to the base electrode *b*. Then the only voltage between these electrodes is a modulated one due to the voltage drop within the semiconductor body 10, which varies with the collector current. Note that this voltage will be of the proper polarity to inject holes from the auxiliary electrode *a* into the semiconductor body 10.

This circuit is disclosed and claimed in the copending application of Robert A. Henle, Serial No. 354,954, now abandoned, filed concurrently herewith.

Figure 7:
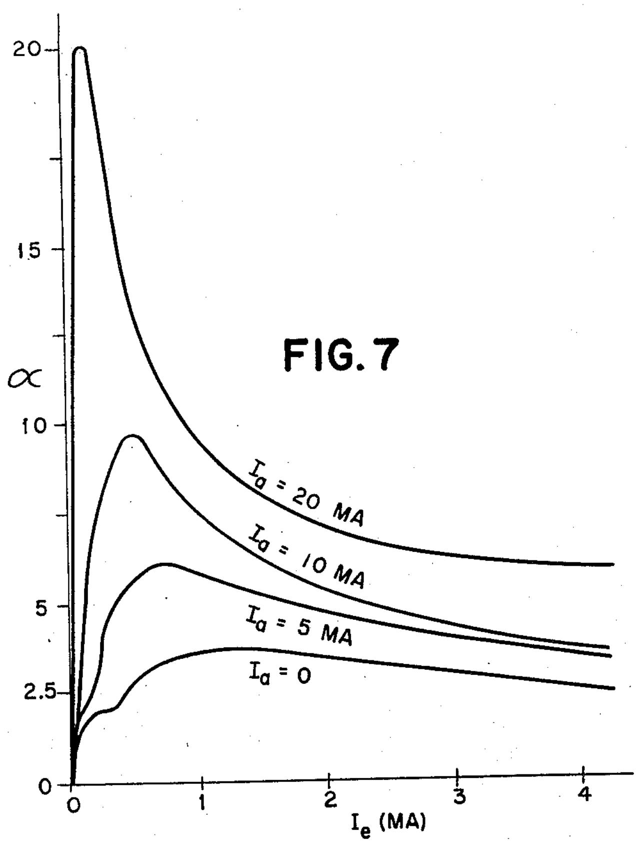
Fig. 7 shows typical $\alpha/I_e$ characteristics for various values of the auxiliary electrode current of the transistor of Fig. 1.

Fig. 7 illustrates the variation of current gain, both incremental and average, of a transistor in accordance with Fig. 1 for various constant current biases. This figure is a plot of $\alpha/I_e$ for various values of constant current flow through the auxiliary electrode *a*. It will be noted that both the average and incremental $\alpha$ increase as the auxiliary current is increased and that the peaks in the $\alpha$ curves move progressively to the left as the auxiliary electrode current is increased. It will also be noticed that the $\alpha I_e$ curve for zero auxiliary current differs in detail from that shown in Fig. 6, although it is generally the same. This is because the curves of Fig. 7 were measured with a different transistor.

Figure 8:
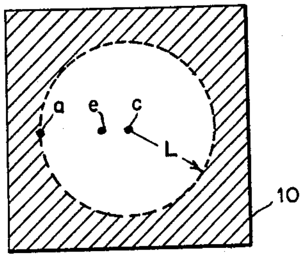
Fig. 8 is a plan view of the transistor of Fig. 1, and is useful in explaining the preferred electrode arrangement.

While the preferred arrangement of the electrodes *a*, *e*, and *c* is as shown in Figs. 1 and 8, i. e., collinearly with the electrode *e* between electrodes *a* and *c*, alternatively, as pointed out above, in the preferred embodiment auxiliary electrode *a* may be positioned anywhere on the surface of the semiconductor body 10 so long as it is at a distance from collector electrode *c* equal to or greater than L. This area is shaded in the plan view of Fig. 8. However, it should also be recalled that the auxiliary electrode *a* may be positioned somewhat within the circumference defined by the radius L in Fig. 8 if the decrease in the back resistance of the transistor can be tolerated. A reservoir of accumulated excess carriers or holes will be produced as long as the electrodes *a* and *c* are not so close that a large proportion of the holes injected by auxiliary electrode *a* reach collector electrode *c*, although the size of this reservoir, i. e., the density of accumulated excess carriers does, of course, decrease as the auxiliary electrode is placed closer to the collector electrode.

Figure 9:
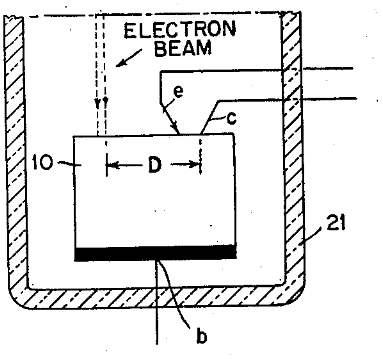
Fig. 9 illustrates a current multiplication transistor, somewhat similar to that shown in Fig. 1, in accordance with this invention.

This reservoir of accumulated excess carriers may be produced in accordance with the present invention in the manner shown in Fig. 9. As there illustrated, a beam of electrons (from conventional means, not shown) is focused upon the surface of semiconductor body 10, again at the distance D from the collector *c*, during operation of the device. The semiconductor device is, of course, enclosed conventionally in a suitable evacuated enclosure 21, e. g., of glass. This electron beam will produce a reservoir of excess carriers which will exist only while the electron bombardment is taking place, and which disappears after the cessation of the bombardment within an interval equal to the excess carrier lifetime of the semiconductor material. As long as the accelerating voltage of the electron beam is small compared to the accelerating voltages in nuclear machines, there will be no permanent effect on the semiconductor body. The electron beam may be modulated, if desired, to vary the current gain of the device, or its intensity may be maintained constant to produce a constant enhanced current gain.

While there have been shown, described and pointed out the fundamental novel features of this invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. The method of enhancing the current gain of a transistor having a semiconductor body and electrodes therefor which comprises applying operating potentials to said electrodes and bombarding a portion of the semiconductor body with electrons, to create a temporary reservoir of accumulated excess carriers in the semiconductor body during the electron bombardment.

2. The method of enhancing the current gain of a transistor having a semiconductor body and a collector electrode therefor which comprises applying an operating potential to said collector electrode and causing a beam of electrons to impinge upon the semiconductor body at a distance from the collector electrode at least equal to the diffusion length for the average lifetime of the excess carriers in the semiconductor, to create a temporary reservoir of accumulated excess carriers in the semiconductor body during the electron impingement.

3. The method of enhancing the current gain of a transistor having a semiconductor body and a collector electrode therefor which comprises applying an operating potential to said collector electrode and causing a beam of electrons to impinge upon the semiconductor body at a distance from the collector electrode approximately equal to the diffusion length for the average lifetime of the excess carriers in the semiconductor, to create a temporary reservoir of accumulated excess carriers in the semiconductor body during the electron impingement.

4. A transistor of the current multiplication type comprising a semiconductor body, collector and base electrodes and a control element therefor, and a source of electrons disposed to cause said electrons to impinge upon one surface of said semiconductor body to form a reservoir of accumulated excess carriers in the semiconductor body.

5. A transistor in accordance with claim 4 wherein said electrons are focussed in a beam and the impingement area is spaced from the collector electrode a distance at least equal to the diffusion length for the average lifetime of the excess carriers in the semiconductor.

6. A transistor in accordance with claim 4 wherein said electrons are focussed in a beam and the impingement area is spaced from the collector electrode a distance approximately equal to the diffusion length for the average lifetime of the excess carriers in the semiconductor.

7. A transistor in accordance with claim 4 including means for modulating the electron flow to vary the current gain of the transistor.

8. A transistor in accordance with claim 4 wherein said control element comprises an emitter electrode and said emitter and collector electrodes and the impingement area of said electrons are arranged co-linearly upon said one surface of said semiconductor body.

References Cited in the file of this patent

UNITED STATES PATENTS

| | | |
|---|---|---|
| 2,547,386 | Gray | Apr. 3, 1951 |
| 2,563,503 | Wallace | Aug. 7, 1951 |
| 2,588,254 | Lark-Horovitz et al. | Mar. 5, 1952 |
| 2,629,802 | Pantchechnikoff | Feb. 24, 1953 |
| 2,670,441 | McKay | Feb. 23, 1954 |

OTHER REFERENCES

Davis et al.: "Nuclear Bombarded Germanium Semi-Conductors II," A. E. C. D. 2054, U. S. A. E. C. Date declassified, June 3, 1948, 6 pages.